Aug. 19, 1969  W. M. DE MAIR ET AL  3,461,742
ADJUSTABLE TRANSLATING CAM STRUCTURE
Filed Oct. 2, 1967  3 Sheets-Sheet 1

INVENTORS
WILLIAM M. DE MAIR
BY THEODORE R. STRAUSS
John A. Harvey
ATTORNEY

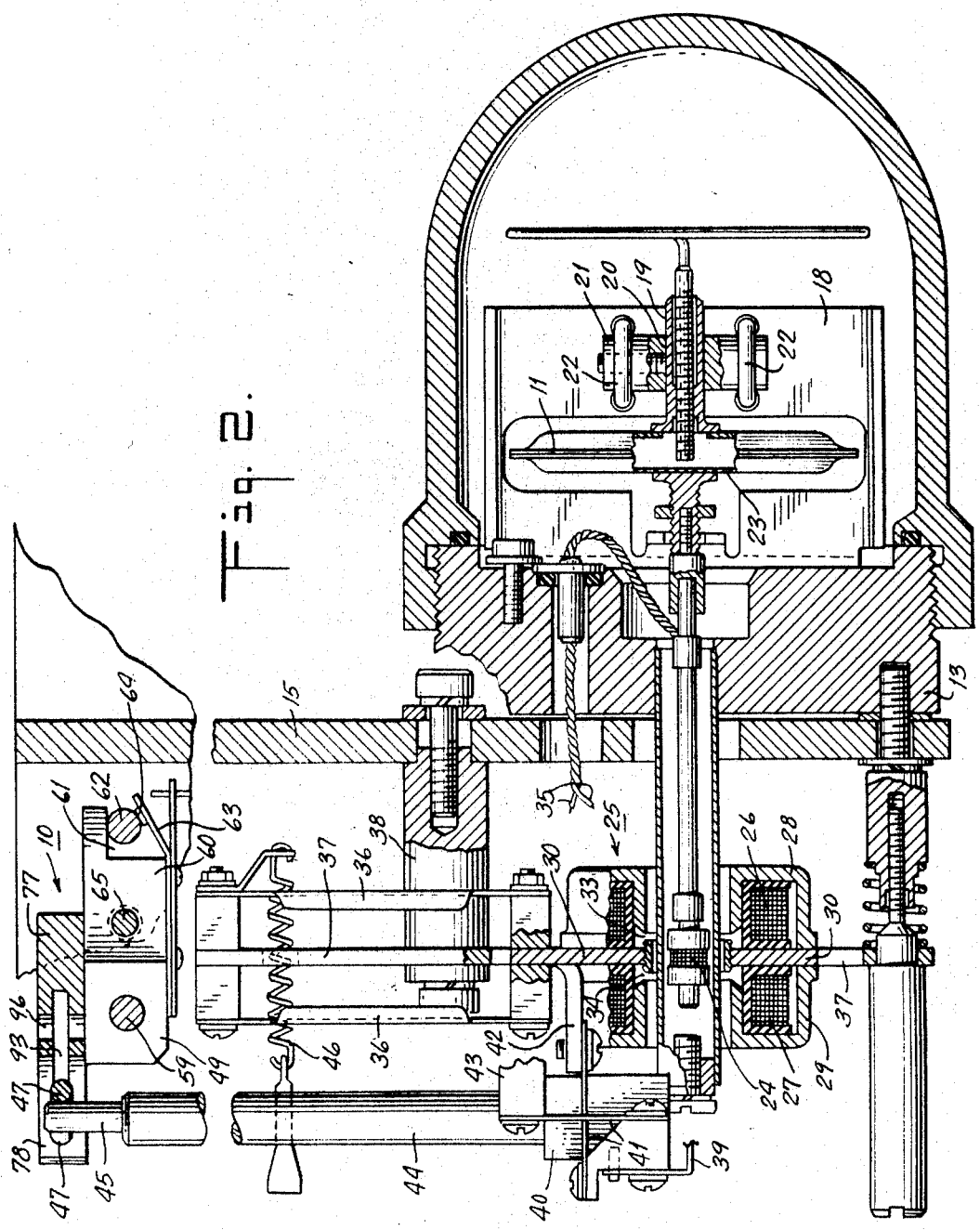

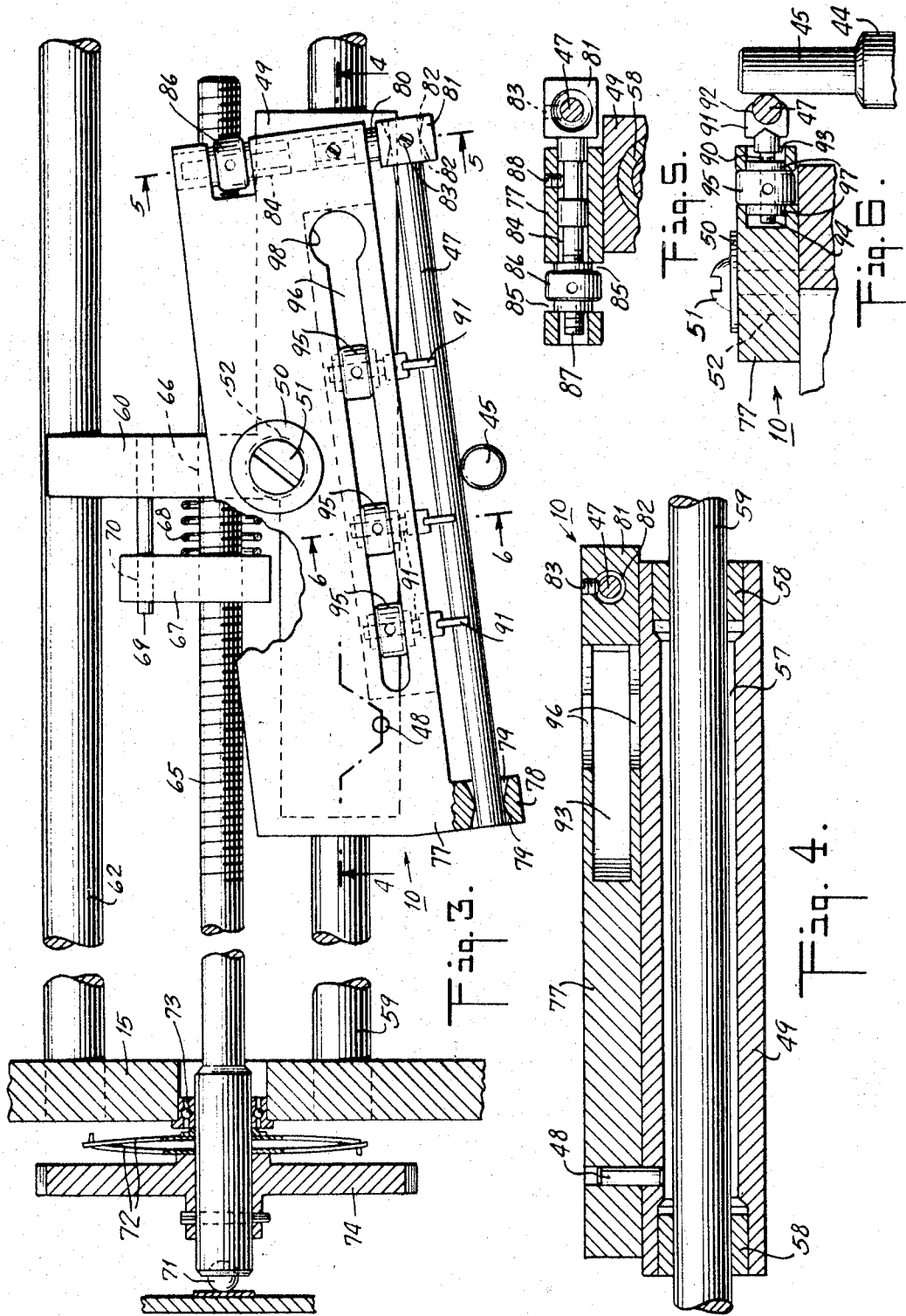

United States Patent Office 3,461,742
Patented Aug. 19, 1969

3,461,742
ADJUSTABLE TRANSLATING CAM STRUCTURE
William M. De Mair, Rutherford, and Theodore R. Strauss, Wayne, N.J., assignors to Wallace & Tiernan Inc., East Orange, N.J., a corporation of Delaware
Filed Oct. 2, 1967, Ser. No. 672,043
Int. Cl. F16h 53/00
U.S. Cl. 74—568                                9 Claims

ABSTRACT OF THE DISCLOSURE

An adjustable translating cam structure is fabricated of a rigid rectangular plate having an edge projection conically apertured to receive and support, in spaced relation to the edge of the plate, one end of an essentially linear and elongated hardened-steel cam rod. The plate has a transverse edge bore spaced from the edge projection and has an end slot normal to the bore and extending therethrough. An elongated support member has one end portion conically apertured to receive and support the other end of the cam rod and is slidably received in the plate bore. The other end of the support member is screw-threaded and an adjusting nut, positionally received in the plate end slot, is threaded onto the support member axially to adjust the position of the latter in the plate bore and thus adjust the spacing of this end of the cam rod from the edge of the plate. For linear movement of the cam structure as oriented with the cam rod forming an angle to the direction of the movement, this adjustable structure provides adjustment of the effective longitudinal rise, dwell and fall of the cam surface profile for a given contour of the cam rod. The cam rod may be adjustably bent, in either of two directions, from longitudinal linearity at one or more points along its length to provide arcuate cam surface contours at the region of each such point. This is accomplished at each point by an elongated adjustable bending member having one end portion gripping the rod and having its opposite end extending through a longitudinal edge slot of the plate to receive a knurled adjustment nut. The latter is positionally received in a second longitudinal slot normal to and intersecting the edge slot, has concentric end shoulders rotationally engaging the walls of the edge slot, and is rotatable to effect axial displacement of the bending member and thus bend the rod toward or away from the edge of the plate and provide a concave or convex arcuate cam rod profile at the region of bend.

Figure 1:
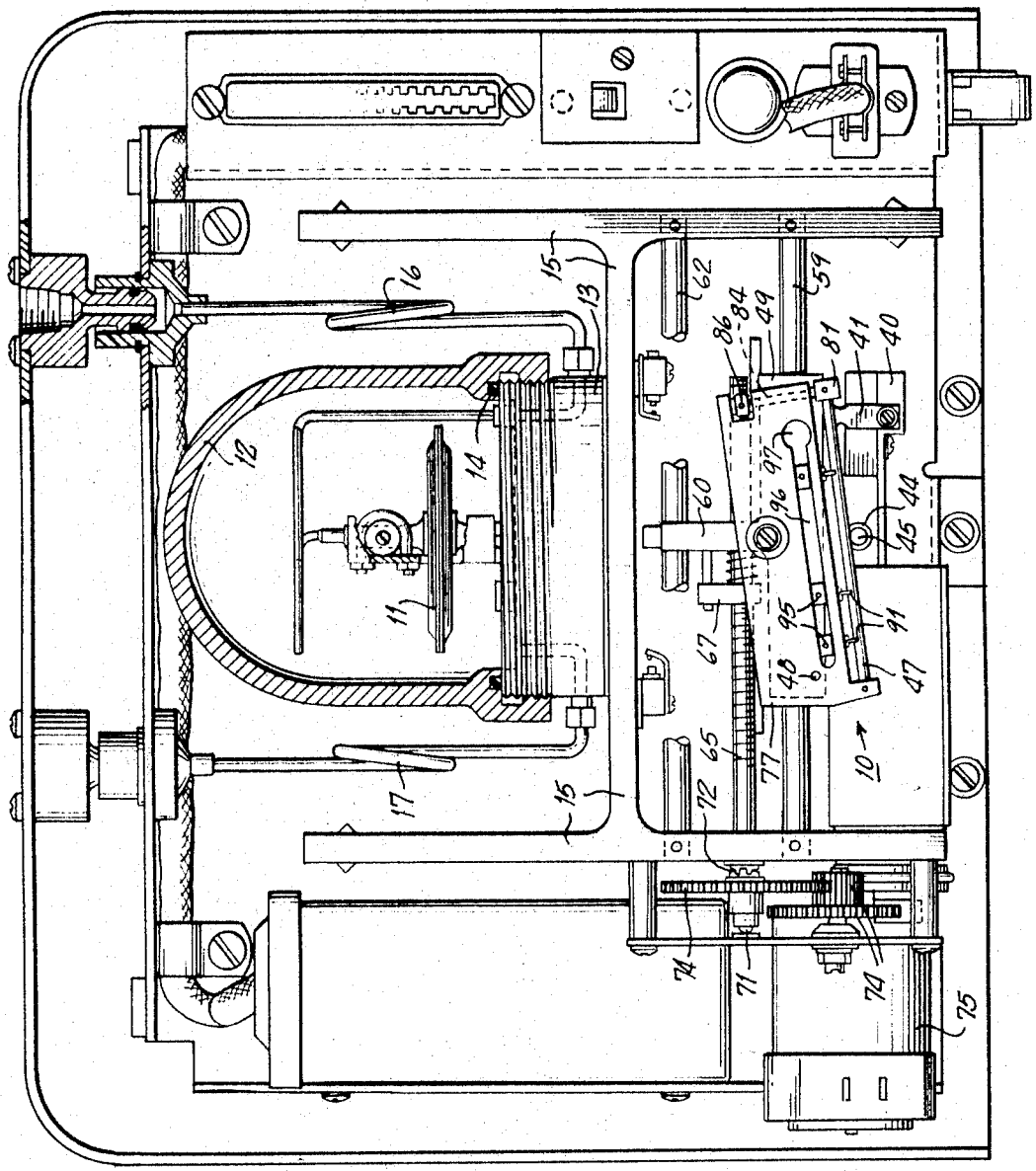

The present invention relates to cam structures and, more particularly, to a translating cam structure which may be considered to possess freely effected adjustment of one or more profile characteristics of its cam surface contour such as the location and value of its rise, dwell and return within and in relation to a given cam-structure range of displacement.

It is an object of the invention to provide a novel translating cam structure wherein a cam surface profile provided thereby may be easily and readily selected and changed from time to time as desired.

It is a further object of the invention to provide a new and improved translating cam structure wherein either or both of the cam surface profile and of its rise, dwell and fall contour at one or more profile regions may be selected and adjusted and changed readily and at will, and one in which this may be accomplished without the need for any of the usual time consuming and costly contour shaping procedures effected by means of machine or hand-shaping operations.

It is an additional object of the invention to provide a unique translating cam structure of relatively simple yet sturdy construction and one characterized by unusual versatility of application and high precision of cam actuation control.

Other objects and advantages of the invention will appear as the detailed description thereof proceeds in the light of the drawings forming a part of this application, and in which:

FIG. 1 is a partially cross-sectional plan view, and
FIG. 2 is a cross-sectional end view, illustrating an adjustable translating cam structure of the invention as forming a component of a follower structure; and
FIGS. 3–6 are enlarged plan and cross-sectional views illustrating the construction of an adjustable translating cam structure embodying the form of the invention utilized in the FIGS. 1 and 2 structures.

Referring now more particularly to FIGS. 1 and 2 of the drawings, an adjustable translating cam structure 10 embodying the invention is illustrated as forming a component of an indicator-element follower structure more fully disclosed and claimed in the De Mair Patent Application Ser. No. D. 7,154, filed concurrently herewith and assigned to the same assignee as the present application. Briefly considered for purposes of description of the present invention, the follower structure includes a pressure-sensitive capsule 11 enclosed within a housing 12 mounted by screw threads upon a housing base 13 with hermetic seal provided by a resilient O-ring 14 as shown. The housing base 13 is secured to a base member 15 of I-shaped cross-section. Gas or vapor under pressure is supplied to the interior of the capsule 11 through a hollow pipe 16, and gas or vapor under pressure is supplied to the interior of the housing 12 through a hollow pipe 17. As shown more clearly in FIG. 2, the capsule 11 is supported from the housing base 13 by a bracket 18 and by means of a capsule support stem 19 received in a transverse bore 20 of a cylindrical support member 21 affixed by U-clamps 22 to the bracket 18.

Any differential pressure within and without the capsule 11 causes flexure of its diaphragm 23 linearly to displace the secondary winding 24 of an inductive transducer 25. The latter includes ring-shaped primary windings 26 and 27 which are enclosed within a transducer magnetic structure comprised by soft iron cup-shaped members 28 and 29 secured on opposite sides of a soft iron mounting plate 30. Upon energization of the transducer primary windings 26 and 27 with alternating current to produce opposed magnetic fields, opposed-polarity symmetrical magnetic fields are produced at the air gaps 33 and 34 of the magnetic structure. So long as the secondary winding 24 is centered in these air gap magnetic fields, no alternating voltage is induced in the secondary winding. Upon axial displacement of the secondary winding to either side of symmetry-center by flexure of the capsule diaphragm 23 in response to a change of differential pressures within and without the capsule 11, a voltage is induced in the secondary winding 24. This induced voltage is supplied through output leads 35 of the winding 24 to a servo system more fully described in the aforementioned De Mair application, and the servo system operates the follower structure in a manner presently to be described to effect follow movement of the magnetic structure of the transducer 25 to follow each such capsule-effected displacement of the transducer secondary winding 24.

This follow motion of the magnetic structure of the transducer 25 is permitted by support of the magnetic structure in a parallelogram support arrangement comprising spaced leaf springs 36 secured between the transducer mounting plate 30 and a sub-base yoke member 37 supported on base-member studs 38. Actual follow movement of the magnetic structure is effected by a longitudinally rigid pair of leaf springs 39 which couple the transducer mounting plate 30 to the ends of a cross bar 40 supported for longitudinal pivotal motion by end pairs of cross flexure springs 41 secured to a flange 42 of the yoke sub-base member 37 and to spacer members 43 secured to a face of the latter. The cross bar 40 supports a cam follower arm 44 having a reduced cylindrical end 45 which is biased by a tension spring 46 into engagement with a cam rod 47 of the translating cam structure 10. The latter is pivotally mounted by a pin 48 on a T-shaped carrier 49 and is fixedly secured in an angularly adjusted position by a plain washer 50 and a machine screw 51 which extends through an enlarged aperture 52 of the cam structure and is threaded into the carrier 49. As shown more clearly in FIGS. 3 and 4, the carrier 49 is provided with a longitudinal bore 57 having bushing inserts 58 at its ends for guided movement of the carrier on a guide rod 59 secured at its ends to the base member 15 (FIG. 1). The T leg 60 of the carrier 49 has an end notch 61 (FIG. 2) and is maintained in guided engagement with a guide rod 62 by a leaf spring 63 secured to the carrier 49 as shown and having a plastic insert 64 engaging the rod 62 which is supported at its ends by the base member 15 (FIG. 1). The carrier 49 with its cam structure 10 is reciprocally driven longitudinally of the guide rods 59 and 62 by a lead screw 65 threaded into a mating internally threaded aperture 66 of the carrier T leg 60. Any lost motion between the threads of the lead screw 65 and the threaded aperture 66 is taken up by a member 67 threaded onto the lead screw 65 to compress a spring 68 between the member 67 and the T leg 60, the member 67 being restrained against rotation by a pin 69 secured to the T leg 60 and slidably received by an aperture 70 of the member 67. As shown in FIGS. 1 and 3, the lead screw 65 is longitudinally positioned by a ball thrust bearing 71 and leaf spring members 72, is journaled for rotation by the threaded aperture 66 of the T leg 60 and by a ball bearing assembly 73 carried by the base member 15, and is mechanically connected by ring and pinion gears 74 to a reciprocally rotatable drive motor 75 energized by the servo system earlier mentioned. This drive is such that by lead screw drive of the carrier 49 and cam structure 10 the cam rod 47 pivots the cam follower arm 44 in such angular direction and to such extent that the magnetic structure of the transducer 25 is caused to precisely follow in direction and extent any displacement of the transducer secondary winding 24 effected by differential pressure flexure of the diaphragm 23 of the capsule 11.

The earlier mentioned angular adjustment of the cam structure 10 on the carrier 49 essentially provides a coarse adjustment of the range of angular pivotal motion of the cam follower arm 44, and thus the range of follow movement of the magnetic structure of the transducer 25, for a given range of movement of the carrier 49. This provides a span adjustment which, in the particular application herein described by way of example, correlates the range of movement of the carrier 49 to any given preselected range of motion of the transducer secondary winding 24 effected by a given range of differential pressures to be measured by the capsule 11.

As shown more clearly in FIG. 3, the cam structure 10 is comprised by a rigid rectangular metal plate 77 having a laterally projecting arm 78 at one end. The latter is provided with oppositely directed coaxial mating conical bores 79 having their axes lying in the median plane of the plate 77. One end of the cam rod 47, which is fabricated of hardened steel and is preferably ground to a linear cylindrical configuration, is supported in the bores 79 by a snug fit permitting small amounts of lateral deflection of the cam rod from longitudinal linearity at one or more regions along its length for a purpose presently to be explained. The other end of the cam rod is supported by an adjustable support means permitting this end of the rod to be adjustably spaced from the adjacent edge of the plate 77. This adjustable support means includes a shouldered stem 80 having a rectangular head 81 provided with oppositely directed coaxial mating conical bores 82 to receive the cam rod 47 with a snug fit, a set screw 83 securing the cam rod in position in the head 81. As illustrated in FIGS. 3 and 5, the shouldered stem 80 is received with a sliding fit in a transverse bore 84 provided near the end of the cam plate 77 in spaced relation to the arm 78 and having its axis normal to the edge of the plate and lying in the median plane of the latter as shown. The plate 77 is provided with an end edge slot 85 transverse to and intersecting the bore 84 and having a width just sufficient to provide a sliding fit with an endshouldered spanner nut 86 threaded onto a threaded end portion 87 of the stem 80. The spanner nut 86 has four centrally located and radially extending cylindrical holes spaced apart at 90° angles to receive the cylindrical nose of an adjusting tool and by which the nut may be manually rotated. Manual rotational adjustment of the spanner nut 86 displaces the stem 80 axially, and thus adjustably spaces this end of the cam rod from the edge surface of the plate 77. This provides a fine or vernier span adjustment of the angle which the cam rod 47 makes with the direction of movement of the carrier 49. The stem 80 is secured in adjusted axial position by a set screw 88 threaded through the cam plate 77 to engage the waist portion of the stem 80 between its shouldered portions.

The end supports of the cam rod 47 by the facing conically tapered apertures 79 and 82 permit bending deflection of the cam rod from longitudinal linearity, and adjustable bending means is provided at one or more spaced points along the length of the cam rod adjustably to bend it at each such point and thereby provide arcuate cam surface contours at the region of each bend. These adjustable bending means have similar constructions and, as more clearly shown in FIGS. 3 and 6, each includes a connecting stem member 90 having a flattened flared head 91 provided with a C end notch 92 partially encircling and gripping the cam rod 47. The connecting stems 90 extend through a longitudinal edge slot 93 of the plate 77, and the other end 94 of each is screw threaded to receive a spanner adjusting nut 95 positionally received with a close sliding fit in a longitudinal slot 96 provided in the plate 77 parallel to its edge and normal to and intersecting its edge slot 93. The adjusting nut 95 is provided with concentric end positioning shoulders 97 which engage the walls of the edge slot 93 as shown to center the connecting stem 90 in the median plane of the plate 77 which also includes the longitudinal axis of the cam rod 47. Manual rotational adjustment of each spanner adjusting nut 95 thus provides adjustable lateral forced deflection of the cam rod 47 from linearity at the point along its length at which the connecting stem 90 is located, such deflections being selectable in either inward or outward directions in respect the adjacent edge surface of the plate 77, while at the same time retaining the axis of the cam rod 47 in the median plane of the plate 77. The C slots 92 of the connecting stem heads 91 have a sliding fit with the cam rod 47 so that they may be manually positioned at selected points along its length.

The longitudinal slot 96 terminates in an end bore 98 through which the spanner nuts 95 are received into the edge slot 93, after which the spanner nuts are threaded upon the end portion 94 of the connecting stems 90. The cam rod 47 is thereafter assembled by insertion through one of the tapered-pair apertures 79 or 82 and by then passing it through the C slots 92 of the connecting stem heads 91 and into position in the other of the apertures 79 or 81. The set screw 83 is then tightened fixedly to secure the cam rod 47 in position in the projecting arm 78 and support stem head 81.

It will be evident that by positioning the adjustable bending assemblies just described at selected points along the cam rod 47 and by manual rotational adjustment of each spanner nut 95, the cam surface of the cam rod 47 in engagement with the cylindrical end portion 45 of the cam follower arm 44 may be given any desired linear or non-linear contour along successive portions of its length. This provides, in conjunction with manual adjustment of the spanner nut 86, adjustment of the effective rise, dwell and fall of the cam surface profile including arcuate cam surface contours at the region of each cam rod bend. Thus the cam rod 47 may be easily and readily and appropriately contoured, as for example to compensate for non-linear displacements of the inductive transducer secondary winding 24 for linear changes of the differential pressure to which the pressure-sensitive capsule 11 is subjected in operation. The ease and ready manner in which the cam rod 47 surface profile may be selected and changed from time to time as desired permits easily effected cam contour adjustments to correct for differences which may occur as between one application of the cam structure and another such application even of the same type, and also permits ready change of cam surface profile to compensate for operational changes which may occur from time to time in a given application utilizing the cam structure. Further, the cam surface profile may be so adjusted to convert a linear character of operation of a device, such as a linear response of the pressure-sensitive capsule 11 to differential pressures, to one corresponding to non-linear operation (i.e., linear to square root or vice versa). The cam structure of the invention possesses a relatively simple yet sturdy construction, yet one characterized by unusual versatility of application and high precision of cam actuation control.

While there has been described for purposes of illustration one specific form of the invention, it is contemplated that numerous changes may be made without departing from the spirit of the invention.

What is claimed is:

1. An adjustable translating cam structure comprising an essentially linear and relatively rigid elongated rod-like cam member, means including a cam support element for supporting said cam member at its ends while permitting bending deflection thereof from longitudinal linearity, and adjustable bending means mechanically connecting said cam member and support element at a preselected point intermediate the length of said cam member for forcibly bending said cam member into and retaining said cam member in a non-linear configuration providing an arcuate cam surface at the region of said preselected point thereof.

2. An adjustable translating cam structure in accordance with claim 1 wherein said cam member is comprised by a hardened-steel cam rod of cylindrical cross-section.

3. An adjustable translating cam structure in accordance with claim 1 wherein said cam support element is comprised by a rigid plate and said cam member is supported with the longitudinal axis thereof substantially coinciding with the median plane of said plate and in spaced relation to an edge surface thereof.

4. An adjustable translating cam strcuture in accordance with claim 3 wherein said plate has an edge projection apertured to receive and support one end of said cam member and is provided with a transverse bore spaced from said projection and normal to said edge surface, and wherein adjustable support means is secured in said bore and provides an aperture to receive and support the other end of said cam member.

5. An adjustable translating cam structure in accordance with claim 4 wherein said adjustable support means comprises a support member slidably received in said bore and having a screw-threaded stem portion and an adjusting nut threaded thereon, said nut being positionally received in an edge slot of said plate and being rotatable for axial positional adjustment of said support member in said bore to vary the spacing of said other end of said cam member from said edge surface of said plate.

6. An adjustable translating cam structure according to claim 4 wherein the aperture of said edge projection and the aperture of said adjustable support means are co-axially aligned and have facing conically tapered wall surfaces to permit said bending deflection of said cam member about transverse support planes thereof.

7. An adjustable translating cam structure in accordance with claim 3 wherein said adjustable bending means is comprised by a connecting member having a first end portion gripping said cam member and a screw-threaded second end portion with an adjusting nut threaded thereon, said second end portion of said connecting member extending through a longitudinal edge slot of said plate and said adjusting nut being positionally received in a longitudinal slot of said plate oriented normal to said edge slot and being rotatable for axial positional adjustment of said connecting member adjustably to bend said cam member to said non-linear configuration.

8. An adjustable translating cam structure in accordance with claim 7 wherein said adjusting nut has concentric end positioning shoulders rotationally engaging the walls of said edge slot to center said connecting member in said longitudinal edge slot of said plate.

9. An adjustable translating cam structure comprising: an essentially linear and relatively rigid, elongated, hardened-steel rod of circular cross-section; a rigid rectangular plate having an edge projection conically apertured to receive and support one end of said rod in spaced relation to the edge of said plate and having a transverse edge bore of circular cross-section spaced from said edge projection and an end slot extending through said bore normal to the longitudinal axis thereof, said plate having a first longitudinal slot formed in said edge thereof intermediate said edge projection and said bore and having a second longitudinal slot intersecting said edge slot and oriented normal thereto; an elongated support member slidably received in said edge bore and having a first end portion conically apertured to receive and support the other end of said rod and having a screw-threaded second end portion; a first adjusting nut positionally received in said end slot of said plate and threaded on said second end portion of said support member for positionally adjusting said support member in said bore to vary the spacing of said other end of said rod from said edge of said plate; an adjustable bending member having a first end portion slidable along and gripping said rod and having a screw-threaded second end portion extending through said edge slot of said plate; and a second adjusting nut threaded on said second end portion of said bending member and positionally received in said second longitudinal slot of said plate, said second adjusting nut having concentric end shoulders rotationally engaging the side walls of said first longitudinal slot of said plate and said second adjusting nut being rotatable for axial positional adjustment of said bending member to bend said rod to a non-linear configuration providing an arcuate cam surface length portion thereof.

References Cited

UNITED STATES PATENTS

| 2,322,031 | 6/1943 | Kuebert | 74—568 |
| 2,565,926 | 8/1951 | Manning | 74—568 XR |
| 2,633,036 | 3/1953 | Winter | 74—568 |
| 2,869,365 | 1/1959 | Anastasia | 74—568 XR |

FRED C. MATTERN, Jr., Primary Examiner

F. D. SHOEMAKER, Assistant Examiner